United States Patent
Gardner et al.

(10) Patent No.: US 12,105,649 B2
(45) Date of Patent: Oct. 1, 2024

(54) METHOD FOR MAINTAINING A RUNNING SOFTWARE SERVICE THROUGH A SOFT REBOOT OF AN OPERATING SYSTEM (OS) KERNEL

(71) Applicant: Oracle International Corporation, Redwood Shores, CA (US)

(72) Inventors: Robert D. Gardner, Fort Collins, CO (US); Henry Willard, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 269 days.

(21) Appl. No.: 17/681,932

(22) Filed: Feb. 28, 2022

(65) Prior Publication Data

US 2023/0273885 A1 Aug. 31, 2023

(51) Int. Cl.
*G06F 13/16* (2006.01)
*G06F 9/4401* (2018.01)

(52) U.S. Cl.
CPC ........ *G06F 13/1668* (2013.01); *G06F 9/4406* (2013.01)

(58) Field of Classification Search
CPC ............................ G06F 13/1668; G06F 9/4406
See application file for complete search history.

(56) References Cited

U.S. PATENT DOCUMENTS 11,194,913 B2 * 12/2021 Gupta .................. G06F 21/123
2021/0103536 A1   4/2021 Galles et al.

OTHER PUBLICATIONS

Need for Standardization in a Thriving Network Ecosystem (Year: Nov. 2020).*
RDMA NIC (Year: 2020).*
Offloading Load Balancers onto SmartNIC (Year: 2020).*

* cited by examiner

*Primary Examiner* — Tammara R Peyton
(74) *Attorney, Agent, or Firm* — Hickman Becker Bingham Ledesma LLP; Brian Miller (57) ABSTRACT

Herein are solutions for computer bus transaction processing by a device that is rebooting. Data and logic of a bus driver of a device are configured to remain loaded and fully operational during an operating system (OS) kernel reboot on the device. That logic is specially memory mapped into an unused area of volatile memory that is not overwritten by the OS kernel. Driver logic is self-contained such that its statically linked codebase contains all logic needed to detect and fully handle an outstanding bus transaction. In an embodiment having a host computer that is connected to a device by a bus, a central processing unit (CPU) of the device bootstraps an OS kernel of the device. Concurrent to bootstrapping the OS kernel, the CPU of the device detects a transaction on the bus that was not initiated by the device, executes an instruction sequence for the transaction, and sends on the bus a response to the transaction.

22 Claims, 4 Drawing Sheets

METHOD FOR MAINTAINING A RUNNING SOFTWARE SERVICE THROUGH A SOFT REBOOT OF AN OPERATING SYSTEM (OS) KERNEL

FIELD OF THE DISCLOSURE

This disclosure relates to computer bus transaction processing by a device that is rebooting. Presented herein are lifecycle management techniques that ensure liveliness of transaction firmware of the rebooting device.

BACKGROUND

The Pensando SmartNIC is a powerful network interface controller (NIC) that is an arm64-based (advanced RISC machines) PCI-e (peripheral component interconnect express) card that is hosted by an x86 server that may be referred to as a host. A state of the art NIC may act as a sophisticated network controller for use by a host such as a rack server such as a blade in a datacenter or cloud. A NIC may run Linux using an embedded arm64 configuration.

A NIC may handle most host PCI-e transactions using hardware acceleration, and these transactions are referred to as direct transactions. Certain host-initiated PCI-e bus transactions may instead be handled by software running on SmartNIC arm processor cores, and these transactions are referred to as indirect transactions. Because indirect transactions may be propagated all the way up to a user space process, there is additional latency. The host bus is very sensitive to response times, and if a transaction is not handled within approximately 200 milliseconds, the host might detect a bus timeout with potentially catastrophic results such as a software abort or system panic. In state of the art systems, indirect transactions are handled by a system service called pciemgrd that is a daemon that runs in user space. This service is initiated by a systemd daemon, and so does not start to run until several seconds after a booting a NIC. Systemd is the primary component of various flavors of Unix such as Linux. Systemd creates and manages all other processes such as daemons, shells, and application programs.

A state of the art NIC may service indirect transactions from operating system (OS) kernel code, which incurs various latency problems. First, whenever the OS kernel of the NIC reboots, a new kernel should be copied into the memory occupied by the old kernel. During this time, the NIC is completely shut down and the memory management units (MMUs) are disabled on all processors of the NIC. This copy takes a little more than 200 milliseconds to complete, and so represents a time when PCI-e transactions are not being serviced. After the new kernel starts, it takes several hundred more milliseconds before any driver code can run. This is another period where PCI-e transactions are not serviced and may timeout.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are solutions for computer bus transaction processing by a device that is rebooting, including driver lifecycle management techniques that ensure liveliness of transaction firmware of the rebooting device. This approach configures data and logic of a driver of a device to remain loaded and fully operational during an operating system (OS) kernel reboot on the device. Driver logic is specially memory mapped into an unused area of volatile memory that is not managed, erased, overwritten, nor repurposed by the OS kernel. Driver logic is specially designed to be self-contained such that its statically linked codebase contains any and all logic needed to detect and fully handle an outstanding peripheral component interconnect express (PCI-e) bus transaction. The self-contained driver has no references to any external data or functions.

When an OS kernel reboot is initiated and the device is being more or less shut down, one of multiple processor cores of the central processing unit (CPU) of the device is specially configured to keep the driver of the device in a PCI-e transaction polling loop of the driver. When the OS kernel reboot finishes and the OS kernel regains control of the device, the driver, and all of the processor cores, the driver will remain in the PCI-e transaction polling loop. In this way, the device may seamlessly continue processing PCI-e transactions even when the OS kernel of the device is rebooting or recently finished rebooting. In an embodiment, the preservation of the ongoing execution of the PCI-e transaction polling loop before, during, and after the reboot guarantees that the device writes a response for a transaction onto the PCI-e bus within 40 milliseconds of the transaction first appearing on the bus, which ensures that the transaction does not timeout.

A host computer that uses the device would react to a timeout by retrying an interaction with the device or ceasing the interaction as failed. A retry means that the interaction needs increased processing time. Cessation on failure means that time already spent processing the interaction is lost and wasted. By avoiding loss or increase of processing time, techniques herein will complete an interaction with the device in less time than the state of the art, which decreases system latency and increases system throughput of the host computer and the device. Thus, techniques herein accelerate the host computer and the device.

In an embodiment having a host computer that is connected to a device by a bus, a central processing unit (CPU) of the device bootstraps an operating system kernel of the device. Concurrent to bootstrapping the operating system kernel, the CPU of the device detects a transaction on the bus that was not initiated by the device, executes an instruction sequence for the transaction, and sends on the bus a response to the transaction.

1.0 Example Host Computer, Bus, and Device

Figure 1:
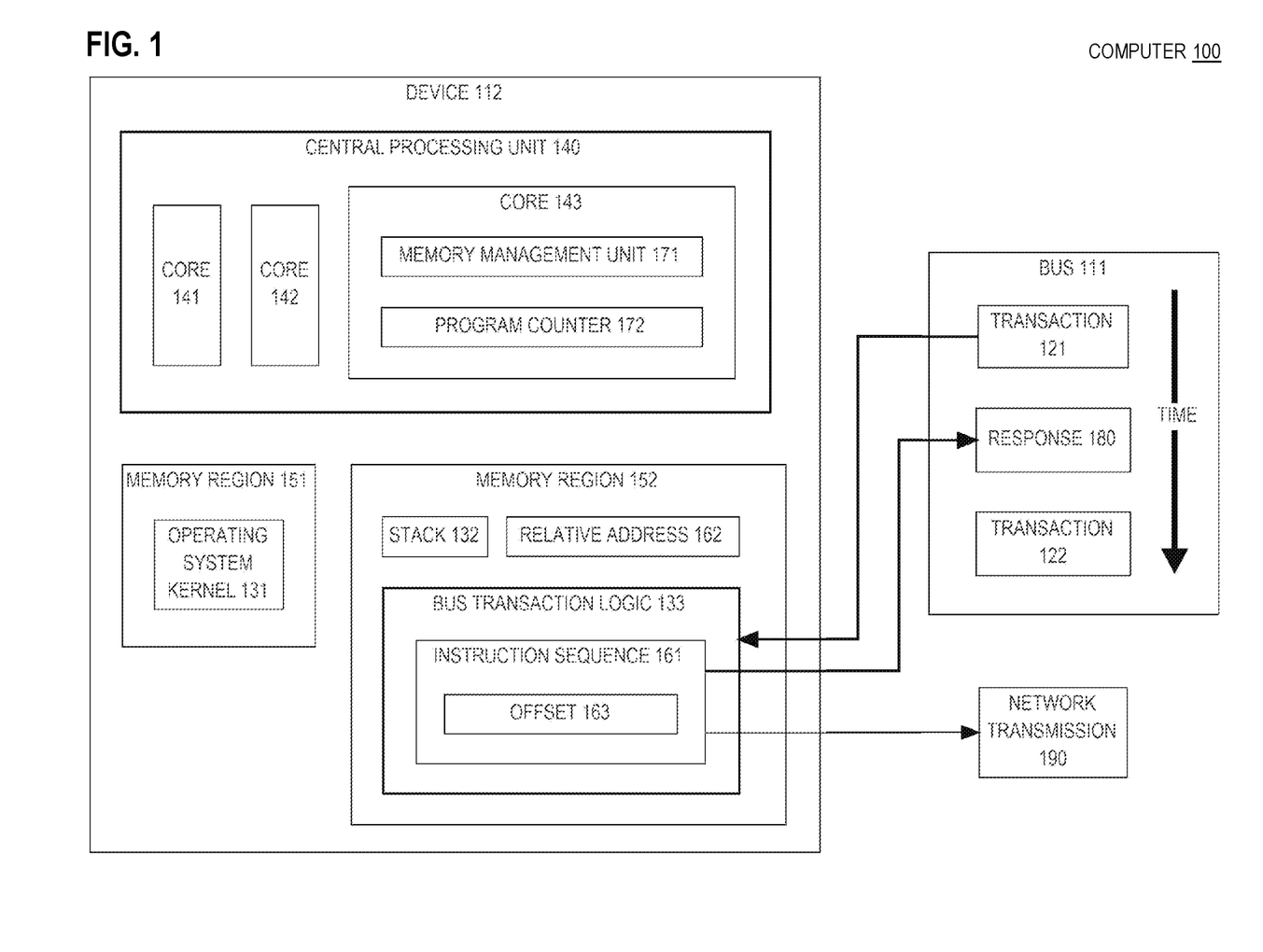
FIG. 1 is a block diagram that depicts an example computer that can implement lifecycle management techniques that ensure liveliness of bus transaction firmware of a device even if the device is rebooting.

FIG. 1 is a block diagram that depicts example computer 100 that can implement lifecycle management techniques that ensure liveliness of bus transaction firmware of device 112 even if device 112 is rebooting. Computer 100 may be a rack server such as a blade, a mainframe, a personal computer, a network appliance, or other physical computing device.

1.1 BUS

Computer 100 contains communication bus 111 that is composed of wires and other circuitry for interconnecting devices. In an embodiment, bus 111 is part of a motherboard or a backplane. In an embodiment, bus 111 and device 112 are parts of a system on a chip (SoC). In an embodiment, bus 111 is a peripheral component interconnect (PCI) express (PCI-e) bus.

1.2 on-Board Central Processing Unit

In an embodiment, device 112 is a network interface controller (NIC) and/or a computer card. Device 112 contains its own central processing unit (CPU) 140. In an embodiment, device CPU 140 is an advanced RISC machines (ARM) CPU. Although not shown, computer 100 separately contains its own CPU that is not CPU 140. For example, both CPUs may reside on: separate subsystems (e.g. design blocks) of an SoC, separate chips on a same computer card, or separate computer cards on a same backplane. Both CPUs may interact with each other and other devices using bus 111. Both CPUs may or may not share memory such as with direct memory access (DMA).

1.2 Bus Transaction

In operation, any CPU or device may initiate bus transaction 121 on bus 111. A transaction may identify a target device, which in this example is device 112. For example, initiating bus transaction 121 may or may not entail transmitting an identifier of the target device on bus 111. Device 112 may detect transaction 121 and detect that device 112 is the target of transaction 121 such as by periodic polling by invoking an input/output (I/O) control (ioctl) system call or by continuous listening.

Device 112 may handle different kinds of bus transactions in different respective ways. For example, device 112 may have hardware that is dedicated to quickly handling a particular kind of bus transaction. Other kinds of bus transactions may need complex handling by bus transaction logic 133 that is software (e.g. firmware) that CPU 140 executes to handle those transactions.

For example, bus transaction logic 133 contains instruction sequence 161 that can handle transaction 121, including writing response 180 onto bus 111 before transaction 121 times out. Response 180 acknowledges that device 112 received and has begun and/or finished handling transaction 121. In an embodiment, bus transaction logic 133 contains a different instruction sequence for each of several kinds of bus transactions.

1.3 Bus Activity

Bus 111 does not simultaneously contain transaction 121 and response 180. As shown by the bold downward arrow, time flows downward for activity on bus 111. For example as shown, a sequence of bus activity may occur in the following ordering: 1) transaction 121, 2) response 180 that is responsive to transaction 121, and 3) transaction 122 that is independent of transaction 121 and response 180. However because transaction 122 is independent, transaction 122 may instead occur between transaction 121 and response 180.

Thus, bus 111 may have multiple transactions that are concurrently outstanding (i.e. being handled or awaiting handling). Transactions 121-122 may be initiated by a same or different devices and may identify a same or different devices as target(s). In this example: a) device 112 initiates neither of transactions 121-122, and b) bus transaction logic 133 handles both of transactions 121-122 that may be a same or different kinds of transactions.

1.4 Kernel Reboot

Ideally, device 112 would always be fully operational while computer 100 and bus 111 are operational. However, device 112 may sometimes reboot for various reasons even though computer 100 and bus 111 are in service and not rebooting. For example, device 112 contains (e.g. as firmware) and executes operating system (OS) kernel 131 that may autonomously reboot (e.g. panic) or be told to reboot by computer 100. In an embodiment, the OS is a Unix flavor such as Linux or POSIX.

Because bus transactions may still occur while OS kernel 131 reboots, bus transaction logic 133 should remain operational while OS kernel 131 reboots, which is a technical challenge because, in other approaches, device 112 would have a bus driver that is heavily reliant on OS kernel 131 and is available only while OS kernel 131 is fully operational. Thus, techniques herein decouple bus transaction logic 133 from OS kernel 131 in several innovative ways.

1.5 Volatile Memory

Device 112 contains volatile memory, including disjoint physical memory region 151 that contains logic and data of OS kernel 131 and physical memory region 152 that contains bus transaction logic 133. Memory region 151 is especially frail due to operational constraints. Operation of memory region 151 and OS kernel 131 are intertwined such that memory region 151 is more or less unusable while OS kernel 131 reboots. For example, rebooting OS kernel 131 may entail erasing most or all contents of memory region 151. Likewise, OS kernel 131 may rely heavily on virtual memory for accessing memory region 151, and virtual memory may be disabled during some phase of rebooting OS kernel 131.

Thus, memory regions 151-152 should be operationally isolated from each other so that, while OS kernel 131 reboots: a) the contents of memory region 152 are not lost, and b) bus transaction logic 133 does not need OS kernel 131. This may require that: a) bus transaction logic 133 does not use virtual memory, and b) instruction sequence 161 does not reference memory outside of memory region 152.

1.6 Relative Addressing

For example, bus transaction logic 133 should use, as scratch memory, only registers of CPU 140, static variables and dynamic heap in memory region 152, and call stack 132 in memory region 152. That is, all code addresses and data addresses, including relative address 162, referenced by instruction sequence 161 should resolve to locations within memory region 152. In an embodiment, bus transaction logic 133 does not use absolute addressing and instead uses only relative addressing.

In an embodiment, bus transaction logic 133 uses only addresses that are relative to program counter (PC) 172 that contains the address of the currently executing instruction, such as an instruction in instruction sequence 161. In other words, while processor core 143 in CPU 140 is executing instruction sequence 161, PC 172 always contains an address of a location in instruction sequence 161 in memory region 152. Instruction sequence 161 may access all other locations in memory region 152, including relative address 162, by using PC-relative addressing that combines PC 172 with offset 163 to dynamically calculate relative address 162 as a location anywhere in memory region 152.

For example, relative address 162 may refer to a location in stack 132, in bus transaction logic 133 or, as shown, a location that is not in stack 132 nor in bus transaction logic 133, such as a location in memory region 152 that contains static data or a dynamic heap. In an embodiment, stack 132 may begin an the highest address of memory region 152 and grow downwards into lower addresses. In a compact embodiment, capacity of stack 132 is configured to not exceed 64 kilobytes.

In various embodiments, CPU 140 may be an implementation for a complex instruction set computer (CISC) or a reduced instruction set computer (RISC). For example, CPU 140 may be advanced RISC machines (ARM) CPU, and instruction sequence 161 may consist of instructions based on the ARM instruction set architecture (ISA).

For example, instruction sequence 161 may contain a load register (LDR) instruction that specifies offset 163 as a signed integer operand that might have a negative value. In an embodiment, all data in memory region 152 is stored in higher address locations than bus transaction logic 133 such that all offsets that refer to data are positive and only offsets that cross reference instructions in bus transaction logic 133 may be positive or negative. For example, control flow mechanisms such as a jump, a loop, or a subroutine call or return may use a positive or negative offset.

In any case, executing the LDR instruction may cause: a) relative address 162 to be calculated based on program counter 172 and offset 163 and b) a value to be copied from memory at relative address 162 into a register of core 140. Offset 163 is shown inside instruction sequence 161, which means that offset 163 may be an operand of an instruction in instruction sequence 161. In other words, offset 163 may be an integer constant that is stored in instruction sequence 161. For example, offset 163 may be a constant that is calculated during source compilation.

1.7 Self-Contained Bus Driver

A software development lifecycle (SDLC) may include a sequence of phases such as compiling, linking, and loading. Compiling entails generating object code that contains machine instructions that are translated from source code such as a high level language (HLL). Object code is unready for execution because it has not yet been linked. Static linking generates a deliverable executable from object code by resolving some or all symbols and memory references. Loading copies the executable into volatile memory and dynamically links any remaining unresolved external references.

In an embodiment, source logic of bus transaction logic 133 is painstakingly handcrafted to avoid some or all kernel system calls and standard library calls so that bus transaction logic 133 is entirely or almost entirely self-contained. In an embodiment, a source compiler is configured (e.g. command-line options) to generate machine instructions in object code that only use relative addressing.

In an embodiment, object code or an executable may be statically analyzed to detect unresolved references, absolute memory addresses that reference locations that are outside of memory region 152, relative memory address references that are not PC-relative, and relative address offsets that are larger than memory region 152. For example, bus transaction logic 133 as object code or as an executable may be automatically verified as being self-contained. In an embodiment, verification of self-containment is based solely on standard Unix commands such as cflow, nm, awk, grep, and obj dump. Verification may occur before or after static linking or before or during loading.

1.8 Networking

As explained earlier herein, instruction sequence 161 handles transaction 121, including writing response 180 onto bus 111. For example, computer 100 may stage outbound data in memory region 152 and may submit transaction 121 to cause network transmission 190 that contains the outbound data. Transaction 121 may identify the address of the outbound data that may be in memory region 152 or instead may not be in device 112 such as in main memory of computer 100 such as on a separate computer card. For example, instruction sequence 161 may use direct memory access (DMA) to load the outbound data into device 112 in memory region 152.

In one example, device 112 sends network transmission 190 more or less immediately for transaction 121 and before device 112 sends response 180. In another example, network transmission 190 is deferred and occurs after response 180. For example, device 112 may be a network interface controller (NIC) that will not send network transmission 190 through a network port until: a) other buffered transmissions are sent and/or acknowledged orb) network transmission 190 is compressed and/or encrypted by device 112. For example even though network transmission 190 is for bus transaction 121, network transmission 190 might not occur until after response 180 and transaction 122 occur on bus 111. Thus, handling of transactions 121-122 may be overlapping, concurrent, or reordered.

2.0 Example Transaction Process

Figure 2:
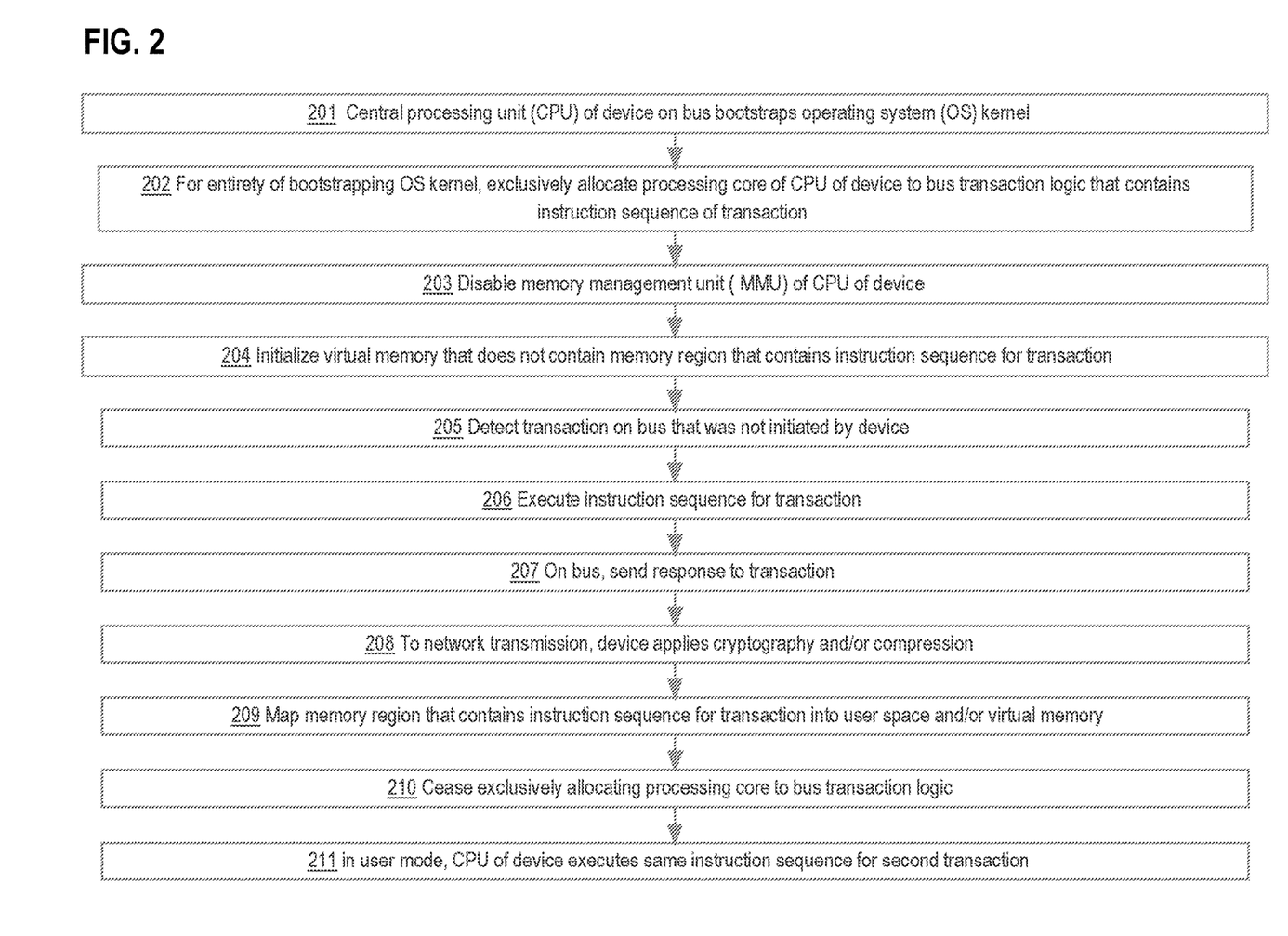
FIG. 2 is a flow diagram that depicts an example computer process for a device to perform for accommodating a reboot of its operating system (OS) kernel while handling a sequence of transactions on a bus.

FIG. 2 is a flow diagram that depicts an example computer process for device 112 to perform for accommodating a reboot of operating system (OS) kernel 131 while handling a sequence of transactions 121-122 on bus 111. FIG. 2 is discussed with reference to FIG. 1.

In step 201, central processing unit (CPU) 140 of device 112 initiates bootstrapping (e.g. soft rebooting) OS kernel 131. As explained below, rebooting OS kernel 131 does not disrupt bus transaction logic 133 nor prevent bus transaction logic 133 from handling new or ongoing bus transactions. A new transaction is a transaction that occurs after step 201, but before bootstrapping OS kernel 131 finishes. An ongoing transaction is a transaction that occurs before step 201, for which device 112 sends a bus response after step 201.

In an embodiment, a first or nearly first action in step 201 may be to inform bus transaction logic 133 of an imminent reboot of OS kernel 131, which may cause bus transaction logic 133 to more or less immediately poll bus 111 to detect whether or not a new transaction is occurring. For example, step 205 (discussed later herein) may be caused by and during step 201.

Although initiated by step 201, bootstrapping OS kernel 131 may be somewhat slow and ongoing, without finishing until after several other steps of the process of FIG. 2, such as not until step 210 finishes. While OS kernel 131 reboots, most or all functionality of OS kernel 131 is inoperative. Steps 202-210 may occur while OS kernel 131 reboots.

Furthermore, CPU 140 may multitask to do additional work while CPU 140 reboots OS kernel 131. Likewise, some steps of the process of FIG. 2 may implement the rebooting of OS kernel 131, and other steps may instead implement bus transaction handling by device 112, with some handling steps concurrent to some rebooting steps. Thus, the sequential ordering of the steps of the process of FIG. 2 may be demonstrative and subject to variation.

Such multitasking may be facilitated by processing cores 141-143 that may concurrently execute. For the entire duration of bootstrapping OS kernel 131, step 202 exclusively allocates at least processing core 143 to bus transaction logic 133. For example, core 141 may perform the bootstrapping steps of the process of FIG. 2, and core 143 may concurrently execute bus transaction logic 133 to perform the transaction handling steps of the process of FIG. 2. In an embodiment, either or both of cores 141-142 spin while idling in a tight loop until OS kernel 131 is finished or almost finished rebooting such as in step 209 or 210 that are discussed later herein.

Step 203 disables memory management unit (MMU) 171 of core 143 and respective MMUs of cores 141-142. Thus, step 203 disables virtual memory for CPU 140 and device 112, which does not disrupt bus transaction logic 133 nor prevent bus transaction logic 133 from handling new or ongoing bus transactions. In other words, bus transaction logic 133 may fully operate without virtual memory.

Bootstrapping step 204 initializes virtual memory that includes memory region 151 but excludes memory region 152. In other words, memory region 152 is outside of virtual memory. Thus, step 204 does not disturb the contents of memory region 152. For example, step 204 may erase memory region 151 by clearing some or all of its binary digits (bits) and/or copying a new image of OS kernel 131 from firmware into memory region 151 such as by invoking system call kexec( ) Step 204 may designate memory region 152 as being one or more reserved portions of volatile memory such as specified in the following kernel boot command line (e.g. kexec) arguments.

earlycon=uart8250,mmio32,0x4800
softdog.soft_panic=1
console=ttyS0,115200n8
capmem=c0000000-c3ffffff:coherent,c4000000-1fffffff:
noncoherent,1000000000-107ffffff:noncoherent,
1200000000-123ffffff:noncoherent
root=PARTUUID=D4E53BE5-7DC1-4199-914C-
48EDFEA92C5E
rootwait
FW_NAME=mainfwa crashkernel=512M
softdog.soft_panic=1

In the above command line arguments, capmem specifies one or more portions of memory region 152 as excluded from management by OS kernel 131. Step 204 may or may not enable the MMUs of cores 141-142 but not the MMU of core 143 that is dedicated to bus transaction logic 133.

In step 205, core 143 executes bus transaction logic 133 to detect transaction 121 on bus 111 that was not initiated by device 112. If bus 111 has a multidrop set of parallel communication wires that is shared by multiple devices, then transaction 121 may contain an identifier of device 112 that step 205 detects so that device 112 may ignore transactions intended for other devices. If bus 111 is instead a switched communication medium such as PCI-e, then transaction 121 need not contain an identifier of device 112.

In step 206, core 143 executes bus transaction logic 133 to detect what is the type of transaction 121. Based on transaction type, bus transaction logic 133 selects instruction sequence 161 for execution for transaction 121. Thus in step 206, core 143 executes instruction sequence 161.

In this example, fulfilment of transaction 121 is deferred as discussed earlier herein, but step 207 more or less immediately sends response 180 on bus 111. In other examples, fulfilment of transaction 121 is not deferred, and step 207 is instead performed after network transmission 190 occurs, which is after step 208.

In step 208, instruction sequence 161 applies cryptography and/or compression to the outbound data that will be sent in network transmission 190 that occurs after step 208.

Bootstrapping steps 209-210 finish bootstrapping OS kernel 131. If bus transaction logic 133 is handling an ongoing transaction, the handling may complete during either of steps 209-210 or after OS kernel 131 resumes full service. In other words, OS kernel 131 transitioning from out of service to in service does not interfere with bus transaction logic 133 handling an outstanding transaction.

Bootstrapping step 209 maps memory region 152 into virtual memory such as into user space. In other words, step 209 may provide OS kernel 131 with access to data and logic in memory region 152 on an ongoing basis. Memory region 152 may have a physical address range that does not change even though step 209 may assign a different virtual address range to memory region 152.

Because bus transaction logic 133 uses only PC-relative addressing, bus transaction logic 133 continues full operation despite a transition into virtual memory. Also because bus transaction logic 133 uses only PC-relative addressing, memory mapping by step 209 does not entail linking, relinking, loading, nor reloading of bus transaction logic 133. For example, offset 163 is more or less always valid and usable as is and regardless of whether OS kernel 131 is rebooting or not and regardless of what step or phase of rebooting may be occurring.

In an embodiment, memory region 152 may be logically partitioned into respective subregions for static variables, dynamic heap, call stack 132, and logic. In an embodiment, step 209 memory maps some or all of the subregions of memory region 152. In an embodiment, adjacent subregions are mapped as adjacent in virtual memory so that relative addressing may, without adjustment, reference some or all of the mapped subregions either through physical addressing or virtual addressing.

Bootstrapping step 210 ceases exclusively allocating processing core 143 to bus transaction logic 133. For example as a result of step 210, bus transaction logic 133 may be executed by any of cores 141-143, and bus transaction logic 133 may share that executing core with logic of OS kernel 131 such as by (e.g. preemptive and/or time-sliced) multitasking. In various embodiments, OS kernel 131 may schedule some or all of bus transaction logic 133 as a high priority task and/or some or all of bus transaction logic 133 as an interrupt handler.

In any case, step 210 may cause OS kernel 131 to manage bus transaction logic 133 as a more or less conventional device driver. Despite this change of management, operation of bus transaction logic 133 is more or less unchanged. For example, step 211 may execute same instruction sequence 161 in non-privileged user mode for a new transaction of a type that instruction sequence 161 should handle. For example, step 211 may cause instruction sequence 161 to handle transaction 122 in user mode.

3.0 Exemplary Embodiment

The following exemplary embodiment of device 112 demonstrates design choices that need not be limitations of other embodiments of device 112 presented earlier herein. In this exemplary embodiment:
  computer 100 is a rack server such as a blade,
  device 112 is a Pensando SmartNIC that can be equipped, configured, and operated as presented in related U.S. patent application Ser. No. 16/971,898 "Programmable Computer IO Device Interface" filed Feb. 19, 2019 by Michael Brian Galles et al, which is incorporated herein in its entirety,
  bus 111 is a PCI-e bus,
  CPU 140 is a multicore ARM-64,
  OS kernel 131 is embedded Linux, and
  network transmission 190 contains: at least one internet protocol (IP) packet, at least one Ethernet frame, or at least one InfiniBand frame.

In this exemplary embodiment, memory region 152 contains the following software modules, some or all of which may, by virtual memory mapping, be usable by OS kernel 131:
  pciemgrd: bus transaction logic 133 as a component that handles PCI-e transactions and can run in user space as a daemon,
  kpcimgr: a component that provides infrastructure for a PCI-e transaction library, and
  pciesvc: a PCI-e transaction library that is contained in bus transaction logic 133 by static linking.

In this exemplary embodiment, kexec( ) is a Linux system call that provides a fast reboot that avoids hardware and firmware involvement, and simply jumps to new kernel code for OS kernel 131.

In this exemplary embodiment, memory region 152 is logically partitioned into the following subregions that are adjacent in the following ascending ordering of memory locations, some or all of which may be memory mapped for use by OS kernel 131:
  hwmem: accessed by both pciesvc and hardware of device 112 and/or of bus 111, and not exceeding sixteen megabytes,
  shmem: contains state of pciesvc and not exceeding ten megabytes,
  kstate: contains state of kpcimgr and not exceeding one megabyte,
  kpcimgr code and data, and not exceeding 256 kilobytes, and
  stack 132: growing downward and not exceeding 64 kilobytes.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
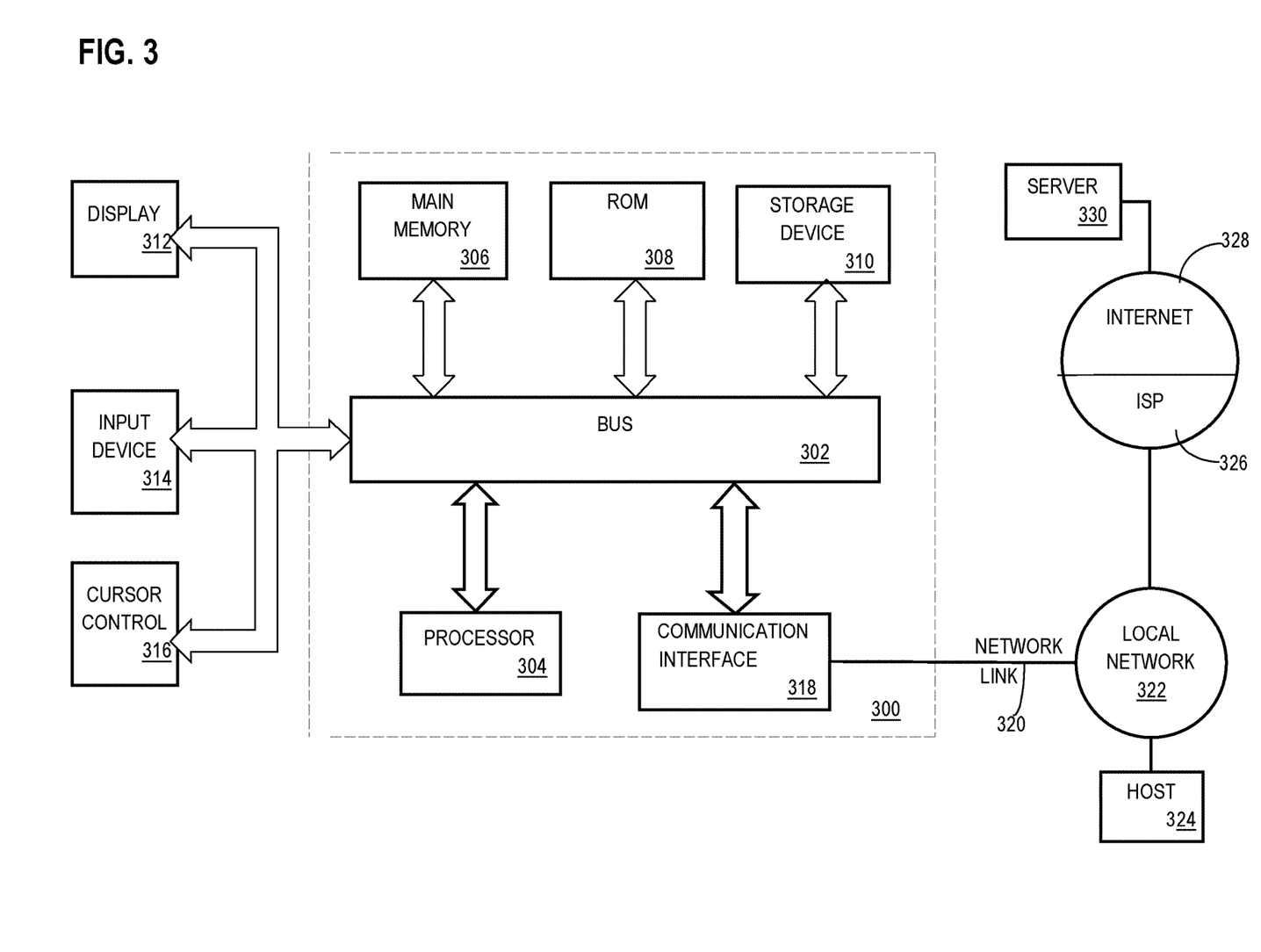
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
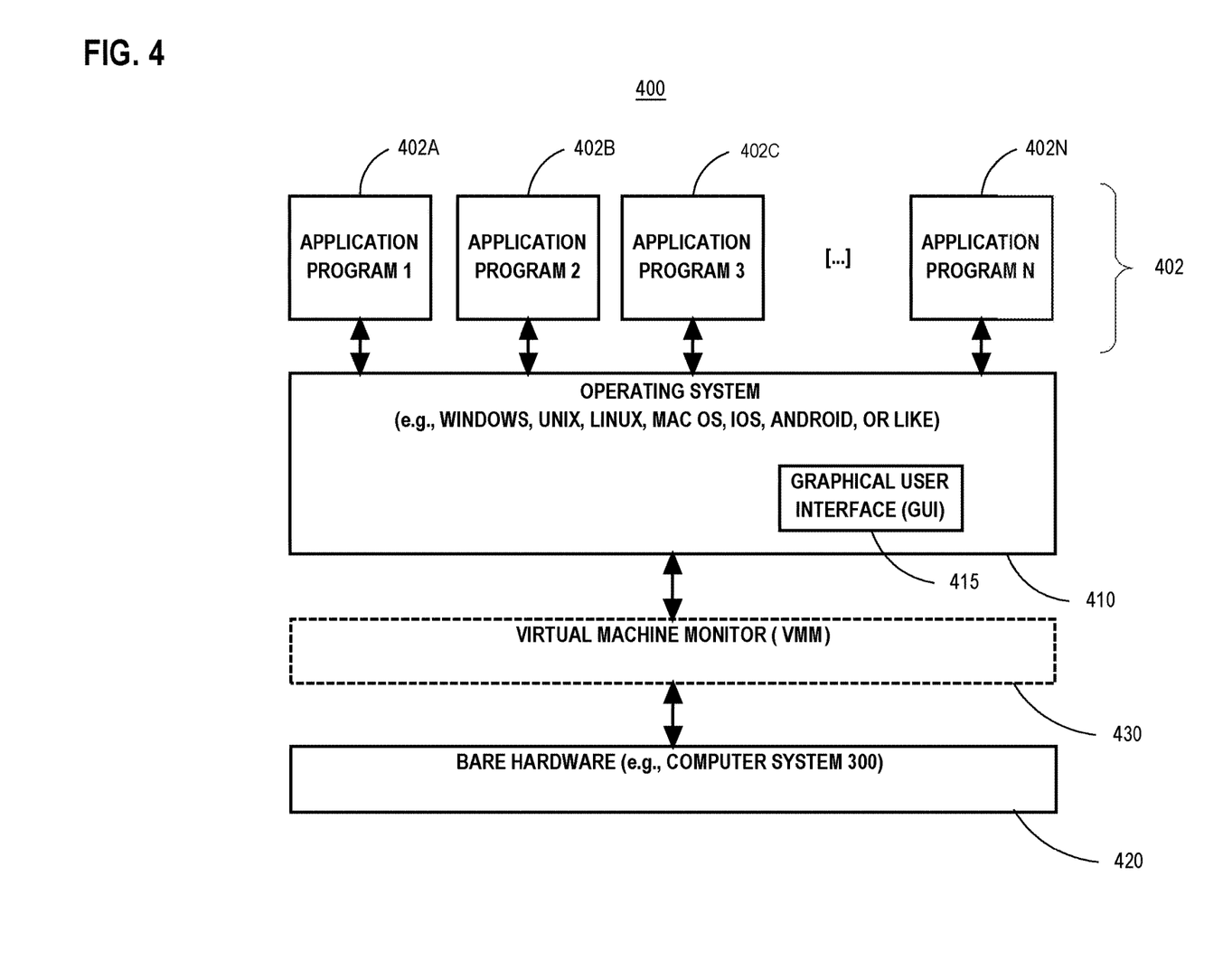
FIG. 4 is a block diagram that illustrates a basic software system that may be employed for controlling the operation of a computing system.

FIG. 4 is a block diagram of a basic software system 400 that may be employed for controlling the operation of computing system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 300. Software system 400, which may be stored in system memory (RAM) 306 and on fixed storage (e.g., hard disk or flash memory) 36, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 36 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 400 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system. CLOUD COMPUTING The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    bootstrapping, by a central processing unit (CPU) of a device on a bus, an operating system kernel;
    said CPU performing, concurrent to said bootstrapping the operating system kernel:
        detecting a transaction on the bus that was not initiated by the device,
        executing an instruction sequence for the transaction, and
        sending on the bus a response to the transaction; and
    said CPU executing, in user mode, said instruction sequence for a second transaction.

2. The method of claim 1 wherein said bootstrapping the operating system kernel comprises initializing virtual memory that does not contain a memory region that contains said instruction sequence for the transaction.

3. The method of claim 2 wherein said bootstrapping the operating system kernel comprises mapping said memory region that contains said instruction sequence for the transaction into at least one selected from the group consisting of user space and the virtual memory.

4. The method of claim 3 wherein said mapping said memory region that contains said instruction sequence for the transaction does not comprise linking said instruction sequence for the transaction.

5. The method of claim 1 wherein:
    the method further comprises disabling a memory management unit (MMU) of the CPU of the device;
    said executing the instruction sequence for said transaction occurs while the MMU of the CPU of the device is disabled.

6. The method of claim 1 further comprising exclusively allocating, during the entirety of said bootstrapping the operating system kernel, at least one processing core of the CPU of the device to bus transaction logic that contains said instruction sequence of the transaction.

7. The method of claim 6 further comprising when said bootstrapping the operating system kernel finishes, ceasing said exclusively allocating said at least one processing core of the CPU of the device on the bus to said bus transaction logic.

8. The method of claim 1 further comprising operating, by said instruction sequence for the transaction, a stack whose capacity does not exceed 64 kilobytes.

9. The method of claim 1 wherein said executing the instruction sequence for said transaction comprises performing all addressing of data relative to a program counter (PC).

10. The method of claim 9 further comprising verifying said all addressing of said data is relative to said PC.

11. The method of claim 10 wherein said verifying said all addressing of said data is relative to said PC occurs during one selected from a group consisting of: before statically linking the instruction sequence for said transaction, and before loading the instruction sequence for said transaction.

12. The method of claim 10 wherein said verifying said all addressing of said data is relative to said PC comprises executing only standard Unix commands.

13. The method of claim 1 wherein said detecting said transaction on the bus is in response to said bootstrapping the operating system kernel.

14. The method of claim 1 wherein said device on the bus is a network interface card (NIC).

15. The method of claim 1 further comprising applying, by said device on the bus, to a network transmission, at least one selected from the group consisting of cryptography and compression.

16. One or more non-transitory computer-readable media storing instructions that, when executed by one or more processors, cause:
bootstrapping, by a central processing unit (CPU) of a device on a bus, an operating system kernel;
said CPU performing, concurrent to said bootstrapping the operating system kernel:
detecting a transaction on the bus that was not initiated by the device,
executing an instruction sequence for the transaction, and
sending on the bus a response to the transaction; and
said CPU executing, in user mode, said instruction sequence for a second transaction.

17. The one or more non-transitory computer-readable media of claim 16 wherein said bootstrapping the operating system kernel comprises initializing virtual memory that does not contain a memory region that contains said instruction sequence for the transaction.

18. The one or more non-transitory computer-readable media of claim 16 wherein:
said instructions further cause disabling a memory management unit (MMU) of the CPU of the device;
said executing the instruction sequence for said transaction occurs while the MMU of the CPU of the device is disabled.

19. The one or more non-transitory computer-readable media of claim 16 wherein said instructions further cause exclusively allocating, during the entirety of said bootstrapping the operating system kernel, at least one processing core of the CPU of the device to bus transaction logic that contains said instruction sequence of the transaction.

20. The one or more non-transitory computer-readable media of claim 16 wherein said executing the instruction sequence for said transaction comprises performing all addressing of data relative to a program counter (PC).

21. The one or more non-transitory computer-readable media of claim 20 further comprising verifying said all addressing of said data is relative to said PC.

22. The one or more non-transitory computer-readable media of claim 17 wherein said bootstrapping the operating system kernel comprises mapping said memory region that contains said instruction sequence for the transaction into at least one selected from the group consisting of user space and the virtual memory.

* * * * *